US009400009B2

(12) United States Patent  
Khanfar

(10) Patent No.: US 9,400,009 B2  
(45) Date of Patent: Jul. 26, 2016

(54) METHOD FOR FORMING A VARIABLE WALL LIGHT WEIGHT AXLE SHAFT WITH FRICTION WELDED FLANGE

(71) Applicant: U.S. Manufacturing Corporation, Warren, MI (US)

(72) Inventor: Adel Mohd Khanfar, Sterling Heights, MI (US)

(73) Assignee: U.S. MANUFACTURING CORPORATION, Warren, MI (US)

( * ) Notice: Subject to any disclaimer, the term of this patent is extended or adjusted under 35 U.S.C. 154(b) by 172 days.

(21) Appl. No.: 14/247,709

(22) Filed: Apr. 8, 2014

(65) Prior Publication Data

US 2015/0285297 A1 Oct. 8, 2015

(51) Int. Cl.  
*F16C 3/02* (2006.01)  
*B21C 37/16* (2006.01)  
(Continued)

(52) U.S. Cl.  
CPC . *F16C 3/023* (2013.01); *B21C 1/18* (2013.01); *B21C 1/24* (2013.01); *B21C 23/085* (2013.01); (Continued)

(58) Field of Classification Search  
CPC ...... B21C 23/085; B21C 23/14; B21C 26/08; B21C 33/006; B21C 37/15; B21C 37/16; B21C 25/08; B21C 1/18; B21C 1/24; B21D 39/046; B21D 53/84; B21D 53/88; B21K 1/06; B21K 1/063; B21K 1/066; B21K 1/10; B21K 21/08; B21K 23/04; Y10T 29/49826; F16C 3/023; F16C 2200/42; F16C 2200/48; F16C 2223/10; F16C 2223/18; F16C 2226/36; F16C 2261/31; F16C 2220/42; F16C 2361/31; B60B 2310/214; B60B 2310/302; B60B 2310/3025; B60B 2310/54  
USPC ................. 72/260, 264, 266, 370.01, 370.02, 72/370.1, 370.11, 370.14–370.18, 72/370.23–370.25, 377; 228/112.1, 114, 228/114.5; 464/183; 301/124.1  
See application file for complete search history.

(56) References Cited

U.S. PATENT DOCUMENTS 3,631,585 A 1/1972 Stamm  
3,886,649 A 6/1975 Simon  
(Continued)

FOREIGN PATENT DOCUMENTS

EP 1839772 10/2007  
KR 20080030821 4/2008  
KR 20130013546 2/2013

OTHER PUBLICATIONS

International Search Report regarding PCT/US2015/024139 dated Jul. 10, 2015.

(Continued)

*Primary Examiner* — Peter DungBa Vo  
*Assistant Examiner* — Joshua D Anderson  
(74) *Attorney, Agent, or Firm* — Foley & Lardner LLP

(57) ABSTRACT

A method for forming a lightweight axle shaft is provided. A first tubular blank is inserted in a die defining an extrusion throat at one end. A tool is inserted into the die having a mandrel with portions of increasing diameter. The tool is moved towards the outlet end of the die to partially extrude the blank through the extrusion throat and form a hollow axle shaft having a variable inner diameter based on the varying diameter of the mandrel. The tool is then removed and a second tubular blank is inserted and placed in engagement with the first blank. The tool, or a different tool, is inserted into the die and again moved towards the outlet end of the die to complete extrusion of the first blank and produce a shaft having diameters at each end that are less than the diameter of an intermediate portion of the shaft.

14 Claims, 4 Drawing Sheets

(51) Int. Cl.
    B21C 23/08    (2006.01)
    B21K 1/06    (2006.01)
    B21C 1/18    (2006.01)
    B21C 1/24    (2006.01)
(52) U.S. Cl.
    CPC .............. B21C 37/16 (2013.01); B21K 1/063 (2013.01); *F16C 2226/36* (2013.01); *Y10T 29/49826* (2015.01)

(56) References Cited

U.S. PATENT DOCUMENTS

| | | |
|---|---|---|
| 4,087,038 A | 5/1978 | Yagi |
| 4,223,825 A | 9/1980 | Williams |
| 4,277,969 A | 7/1981 | Simon |
| 4,301,672 A | 11/1981 | Simon |
| 4,435,972 A * | 3/1984 | Simon ................... B21C 23/14 138/109 |
| 4,487,357 A | 12/1984 | Simon |
| 4,659,005 A | 4/1987 | Spindler |
| 5,205,464 A | 4/1993 | Simon |
| 5,213,250 A | 5/1993 | Simon |
| 5,303,985 A | 4/1994 | Barnholt et al. |
| 6,439,672 B1 | 8/2002 | Simon |
| 2004/0060385 A1 | 4/2004 | Prucher |
| 2006/0131949 A1 | 6/2006 | Jahani et al. |
| 2006/0183561 A1 | 8/2006 | Briggs |

OTHER PUBLICATIONS

EP Search Report and Search Opinion dated Aug. 18, 2015 regarding Application No. 15162837.

* cited by examiner

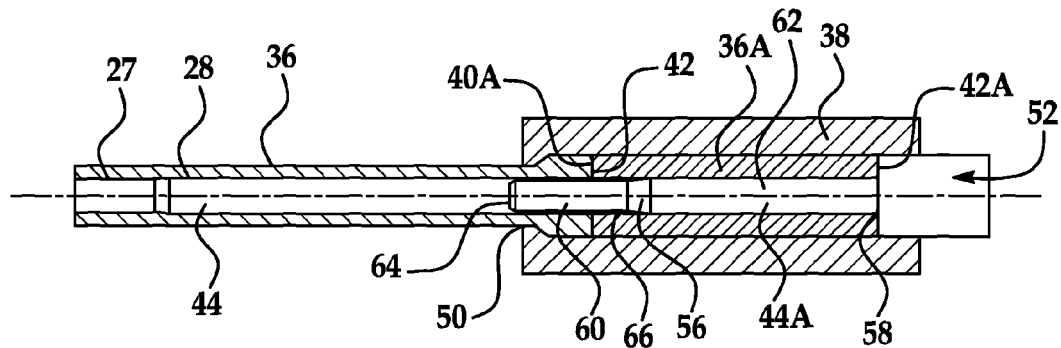
FIG. 4D1
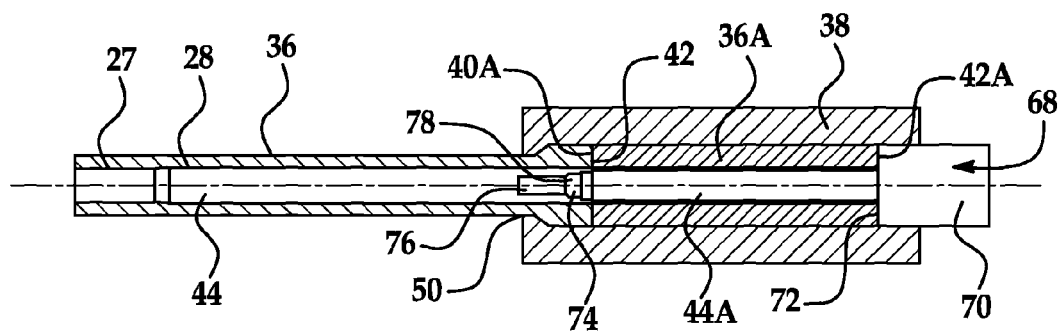
FIG. 4D2
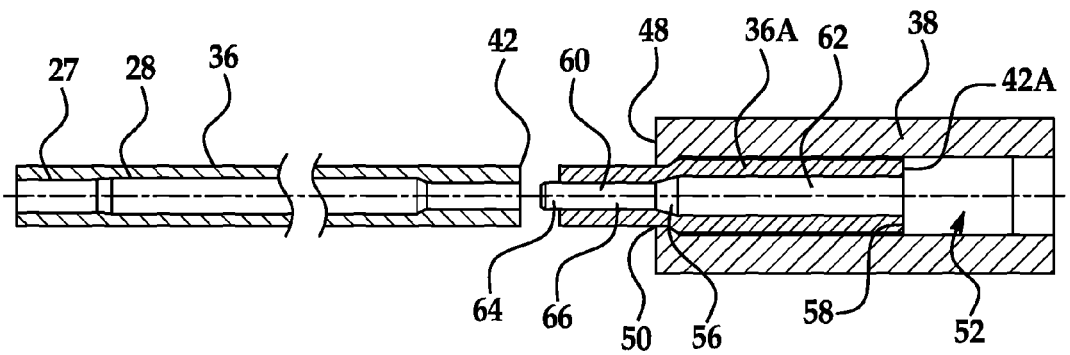
FIG. 4E1

FIG. 4E2

METHOD FOR FORMING A VARIABLE WALL LIGHT WEIGHT AXLE SHAFT WITH FRICTION WELDED FLANGE

BACKGROUND OF THE INVENTION a. Field of the Invention

This invention relates to axle shafts. In particular, the invention relates to a method for forming a lightweight axle shaft having variable inner and outer diameters.

b. Background Art

Axle shafts are often subjected to significant loads. Vehicle drive axle shafts, for example, transmit significant torque to the vehicle wheels and are subject to rapid starts and stops in operation. Because of the significant loads that are often imposed on axle shafts, most axle shafts are formed of solid metal to provide sufficient rigidity and strength. Solid axle shafts, however, require a significant amount of material and are relatively heavy. In vehicles, this weight has a negative effect on fuel economy and imposes additional loads on other vehicle components.

Because of the disadvantages associated with solid drive axle shafts, hollow drive axle shafts have been developed as shown, for example, in U.S. Pat. No. 5,213,250, the entire disclosure of which is incorporated herein by reference. Existing methods for forming hollow axle shafts, however, make it difficult to both quickly manufacture multiple axle shafts while also varying the inner and/or outer diameters of the shafts to achieve the objectives of a particular application for the shafts.

The inventor herein has recognized a need for a method for forming an axle shaft that will minimize and/or eliminate one or more of the above-identified deficiencies.

BRIEF SUMMARY OF THE INVENTION

This invention relates to axle shafts. In particular, the invention relates to a method for forming a lightweight axle shaft having variable inner and outer diameters.

A method for forming an axle shaft in accordance with one embodiment of the invention includes the step of inserting a first tubular blank having a leading end and a trailing end into a die. The die has an inlet end and an outlet end defining an extrusion throat through which the first tubular blank is extruded beginning with the leading end of the first tubular blank and ending with the trailing end of the first tubular blank. The method further includes the step of inserting a tool into the die. The tool defines a surface configured to engage the trailing end of the first tubular blank and a has a mandrel configured to be received within the extrusion throat of the die and the first tubular blank. The mandrel has a first portion having a first diameter and a second portion having a second diameter different from the first diameter. The method further includes the step of moving the tool within the die such that the surface of the tool engages the trailing end of the first tubular blank and a leading end of the first portion of the mandrel exits the first tubular blank and extends beyond the leading end of the first tubular blank. The method further includes the step of applying a force to the tool to move the tool towards the outlet end of the die and extrude the first tubular blank through the extrusion throat to form the axle shaft. A first end portion of the axle shaft assumes a shape having an outer diameter defined by the extrusion throat and an inner diameter defined by a trailing end of the first portion of the mandrel. An intermediate portion of the axle shaft assumes a shape having an outer diameter defined by the extrusion throat and inner diameter defined by the second portion of the mandrel. The method further includes the steps of withdrawing the tool from the die and inserting a second tubular blank having a leading end and a trailing end into the die. The leading end of the second tubular blank engages the trailing end of the first tubular blank. The method further includes the steps of reinserting the tool into the die and moving the tool within the die such that the surface of the tool engages the trailing end of the second tubular blank and a leading end of the first portion of the mandrel exits the second tubular blank and extends beyond the leading end of the second tubular blank into the trailing end of the first tubular blank. Finally, the method includes the step applying a force to the tool to move the tool towards the outlet end of the die such that a second end portion of the axle shaft assumes a shape having an outer diameter defined by the extrusion throat and an inner diameter defined by the leading end of the first portion of the mandrel.

A method for forming an axle shaft in accordance with another embodiment of the invention includes the step of inserting a first tubular blank having a leading end and a trailing end into a die. The die has an inlet end and an outlet end defining an extrusion throat through which the first tubular blank is extruded beginning with the leading end of the first tubular blank and ending with the trailing end of the first tubular blank. The method further includes the step of inserting a first tool into the die. The first tool defines a surface configured to engage the trailing end of the first tubular blank and a has a mandrel configured to be received within the extrusion throat of the die and the first tubular blank. The mandrel has a first portion having a first diameter and a second portion having a second diameter greater than the first diameter. The method further includes the step of moving the first tool within the die such that the surface of the first tool engages the trailing end of the first tubular blank and the first portion of the mandrel is disposed within the first tubular blank and the extrusion throat of the die. The method further includes the step of applying a force to the first tool to move the first tool towards the outlet end of the die and extrude the first tubular blank through the extrusion throat to form the axle shaft. A first end portion of the axle shaft assumes a shape having an outer diameter defined by the extrusion throat and an inner diameter defined by the first portion of the mandrel and a first intermediate portion of the axle shaft assumes a shape having an outer diameter defined by the extrusion throat and inner diameter defined by the second portion of the mandrel. The method further includes the steps of withdrawing the first tool from the die and inserting a second tubular blank having a leading end and a trailing end into the die. The leading end of the second tubular blank engages the trailing end of the first tubular blank. The method further includes the step of inserting a second tool into the die. The second tool defines a surface configured to engage the trailing end of the second tubular blank and a has a mandrel configured to be received within the extrusion throat of the die and the first tubular blank. The mandrel of the second tool has a third diameter less than the second diameter. The method further includes the step of moving the second tool within the die such that the surface of the second tool engages the trailing end of the second tubular blank and the mandrel of the second tool is disposed within the first tubular blank and the extrusion throat of the first die. Finally, the method includes the step of applying a force to the second tool to move the second tool towards the outlet end of the die such that a second end portion of the axle shaft assumes a shape having an outer diameter defined by the extrusion throat and an inner diameter defined by the mandrel of the second tool.

A method for forming an axle shaft in accordance with the present invention represents an improvement relative to conventional methods for forming axle shafts. By using successive blanks and accurately positioning the blanks and tools, the inventive method allows rapid production of axle shafts while also allowing the shafts to be formed with varying inner and outer diameters. Further, the inventive method permits formation of a hollow axle shaft with relatively thick end sections to accommodate loads from coupling the ends of the axle shaft to other components. In the case of a rear drive axle shaft, for example, the method permits a relatively thick wall at the wheel flange joint thereby increasing weld joint strength.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 4A-G are cross-sectional drawings illustrating steps in a method for forming an axle shaft in accordance with various embodiments of the present invention.

DETAILED DESCRIPTION OF THE INVENTION

Figure 1:
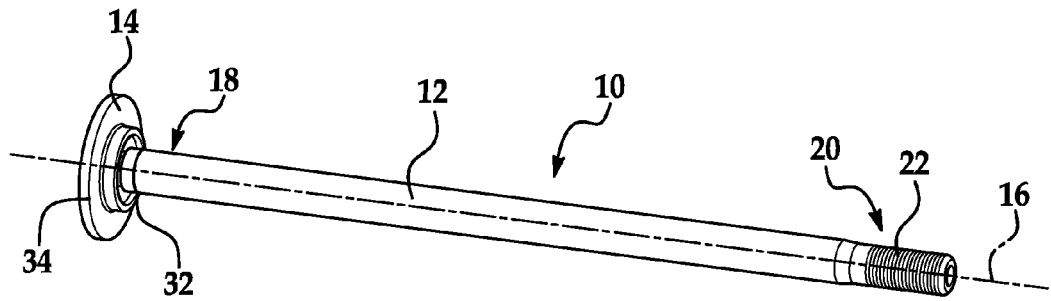
FIG. 1 is a perspective view of an axle shaft formed in accordance with a method in accordance with one embodiment of the present invention.
Figure 2:
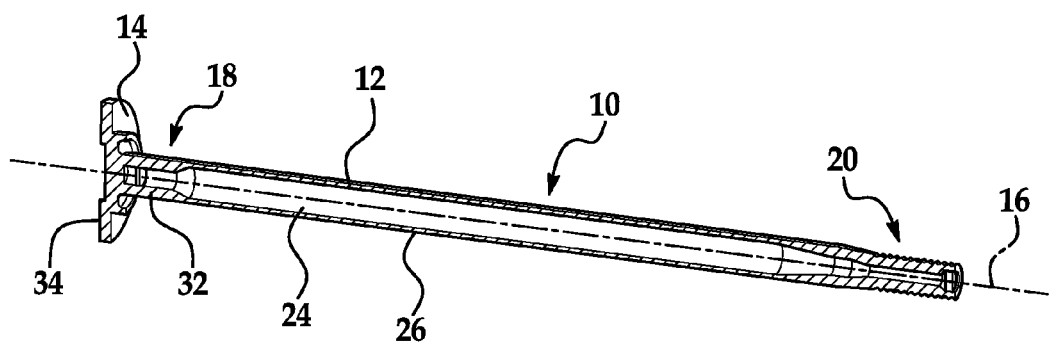
FIG. 2 is a cross-sectional view of the axle shaft of FIG. 1.

Referring now to the drawings wherein like reference numerals are used to identify identical components in the various views, FIGS. 1-2 illustrate one embodiment of an axle shaft 10 that may be formed using a method in accordance with the present invention. Shaft 10 is particularly adapted for use in a vehicle drive axle and, more particularly, a rear drive axle. It should be understood, however, that the methods disclosed herein can be used in the formation of axle shafts for front drive axles and in other vehicular and non-vehicular power transmission applications. Shaft 10 may include a body 12 and a wheel flange 14.

Figure 3:
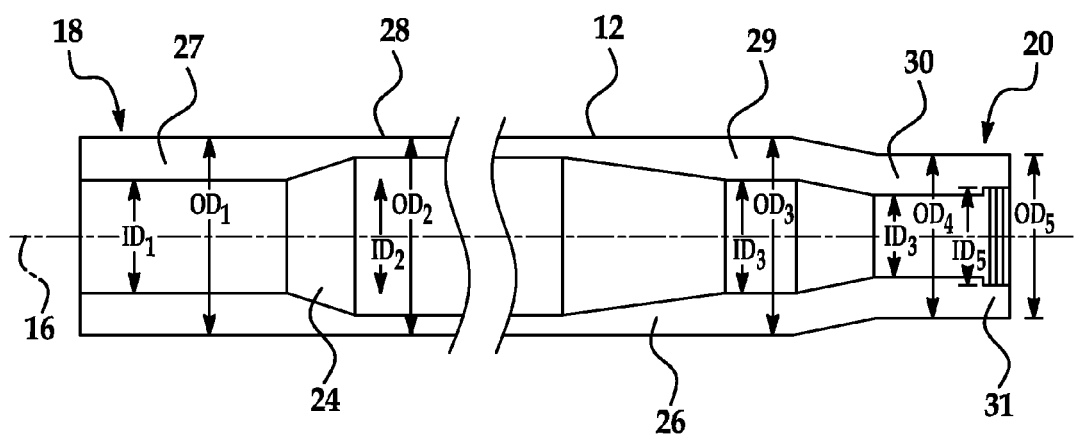
FIG. 3 is a cross-sectional view of portions of the axle shaft of FIGS. 1-2.

Body 12 may be used to transfer torque between a drive member and a driven member such as from a vehicle drivetrain (not shown) to one or more vehicle wheels (not shown). Body 12 may be made from conventional metals and metal alloys. Body 12 is elongate and is disposed about, and may be centered about, a rotational axis 16. One longitudinal end 18 of body 12 may be coupled to flange 14 and may be configured to support a vehicle wheel. The other longitudinal end 20 of body 12 may be coupled to a side gear (not shown) in a differential. Referring again to FIG. 1, the radially outer surface of end 20 may define a plurality of axially extending splines 22 configured to engage corresponding splines in a bore of side gear in order to couple shaft 10 for rotation with the side gear. The splines may be formed by, for example, rolling or swaging. Body 12 is also tubular or hollow in order to reduce the weight of axle shaft 10 relative to conventional solid axle shafts and defines a bore 24 extending along a portion or all of the length of body 12. The outer and/or inner diameters of body 12 may vary to define a wall 26 of varying thickness (and a bore 24 of varying diameter) along the length of body 12 in order to accommodate variations in loads along the length of body 12. Referring to FIG. 3, the wall 26 at an end portion 27 of body 12 near end 18 may be relatively thick and have an outer diameter $OD_1$ and an inner diameter $ID_1$.

Moving in an inboard direction, the inner diameter of wall 26 may increase such that wall 26 at an intermediate portion 28 of body 12 is relatively thin and has an outer diameter $OD_2$ equal to outer diameter $OD_1$ and an inner diameter $ID_2$ that is greater than inner diameter $ID_1$. Continuing in an inboard direction, the inner diameter of wall 26 may decrease such that wall 26 at an intermediate portion 29 of body 12 is relatively thick and has an outer diameter $OD_3$ equal to outer diameter $OD_1$ and an inner diameter $ID_3$ that is less than inner diameter $ID_2$. Inner diameter $ID_3$ may be equal to inner diameter $ID_1$, but may also vary relative to inner diameter $ID_1$. Continuing in an inboard direction, both the outer diameter and the inner diameter of wall 26 may decrease such that wall 26 at an end portion 30 of body 12 near end 20 of body 12 is relatively thick and has an outer diameter $OD_4$ that is less than outer diameter $OD_1$ and an inner diameter $ID_4$ that is less than inner diameters $ID_2$ and $ID_3$. Inner diameter $ID_4$ may also be less than $ID_1$. Finally, an end portion 31 of body 12 at end 20 of body 12 may also be relatively thick and have an outer diameter $OD_5$ equal to outer diameter $OD_4$ and an inner diameter $ID_5$ that is greater than inner diameter $ID_4$ for a purpose described hereinbelow. It should be understood that the variation in wall 26 shown in body 12 is exemplary only and that the inner and/or outer diameters of wall 18 may vary depending on the application to accommodate anticipated needs in terms of strength, packaging and other parameters. Referring again to FIG. 2, bore 24 may be machined at end 20 to define internal threads, grooves or other formations configured to receive a plug or other type of seal (not shown).

Wheel flange 14 is provided to support a driven member such as a vehicle wheel and to couple the driven member to axle shaft 10 for rotation therewith. Flange 14 may be forged from conventional metals and metal alloys. Flange 14 includes an axially extending annular hub 32 that is configured for coupling to end 18 of body 12. An inboard end of hub 32 may be annular in shape and have inner and outer diameters equal to the inner and outer diameters $ID_1$, $OD_1$ of end 18 of body 12. The outboard end of hub 32 may be closed to prevent foreign objects and elements from entering bore 24 in body 12. Flange 14 also includes a wheel mounting portion 34 that extends radially outwardly from hub 32. Portion 34 may be generally circular in shape and may include a plurality of bores (not shown) extending parallel to axis 16 and configured to receive bolts (not shown) used to support the vehicle wheel.

Figure 4A:
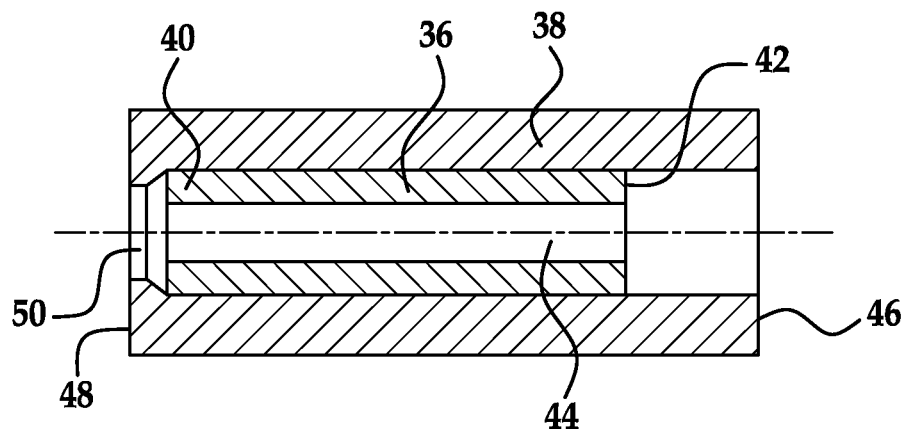

Referring now to FIGS. 4A-G, methods for forming an axle shaft, such as axle shaft 10, in accordance with various embodiments of the present invention will be described. Referring to FIG. 4A, the method may begin with the step of inserting a tubular blank 36 in a die 38. Blank 36 is made from conventional metals and metal alloys with a material composition and size selected depending on the needs of the application. Blank 36 may be cut to length from a longer pole of the selected material. Blank 36 has a leading end 40 and a trailing end 42 with leading end 40 inserted into die 38 before trailing end 42. Blank 36 also defines a bore 44 that extends along the length of blank 38 between ends 40, 42. Prior to insertion of blank 36 into die 38, a reactive forming lubricant may be applied to blank 36. Die 38 is tubular in shape, is pre-stressed, and defines an inlet end 46 and an outlet end 48. The opening formed an inlet end 46 has a diameter sized to receive blank 36 in an undeformed state. The opening formed at outlet end 48 has a diameter that is smaller than the diameter of the opening at inlet end 46 (and the undeformed blank 36) and comprises an extrusion throat 50 through which blank 36 is extruded beginning with leading end 40 of blank 36 and ending with trailing end 42 of blank 36. The area in die 38 immediately preceding outlet end 48 comprises a reduction zone and the diameter of this area may vary to create an angled surface to promote efficient material flow.

Figure 4B:
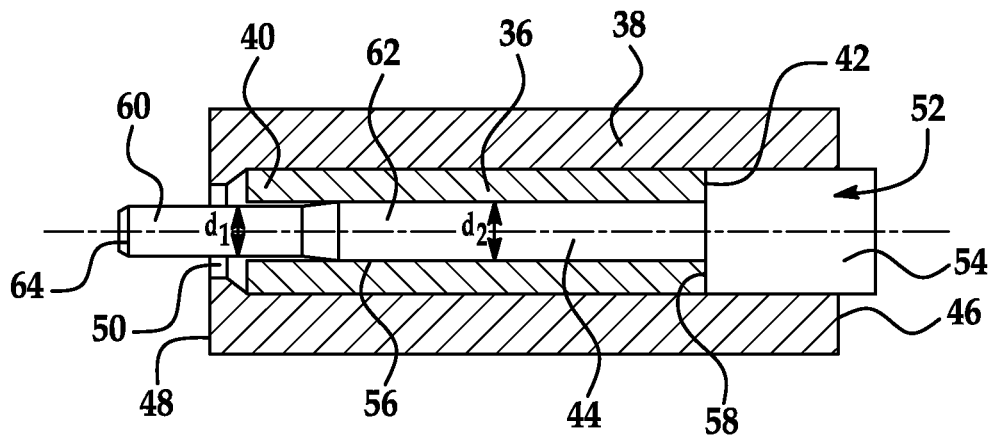

Referring to FIG. 4B, the method may continue with the step of inserting a tool 52 into die 38. Tool 52 may comprise a punch or similar tool. Tool 52 includes a body 54 and a mandrel 56 extending from body 54. Body 54 has a diameter that is about equal to the inner diameter of die 38 and the diameter of blank 36. Body 54 defines a surface 58 at one end configured to engage trailing end 42 of blank 36. Mandrel 56 is configured to be received within bore 44 of blank 36 and extrusion throat 50 of die 38. Mandrel 56 may have a varying diameter along its length. In the illustrated embodiment, mandrel 56 includes a first portion 60 having a first diameter $d_1$ and a second portion 62 having a second diameter $d_2$ that is different from diameter $d_1$. In the illustrated embodiment, diameter $d_2$ is greater than diameter $d_1$. It should be understood that mandrel 56 may have more than two portions having different diameters and that the diameters can increase or decrease moving from portion to portion along the length of mandrel 56. The method may continue with the step of moving tool 52 within die 38 such that surface 58 engages trailing end 42 of blank 36 and a leading end 64 of portion 60 of mandrel 56 exits blank 36 and extends beyond leading end 40 of blank 36.

Figure 4C:
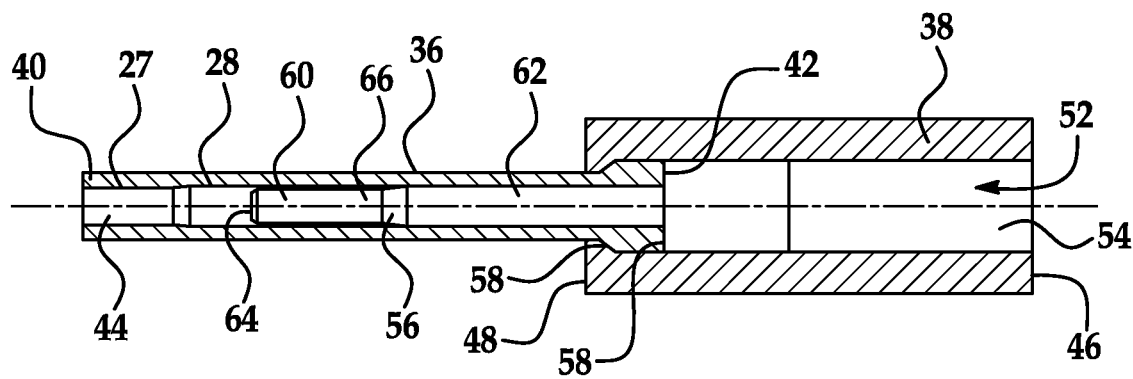

Referring to FIG. 4C, the method may continue with the step of applying a force to tool 52 to move tool 52 towards the outlet end 48 of die 38 and extrude blank 36 through throat 50 to begin forming the tubular body 12 of the axle shaft 10. As the leading end 40 of blank 38 is extruded through die 38, the leading end collapses about mandrel 56 and one end portion 27 of the body 12 assumes a shape having an outer diameter defined by throat 50 and an inner diameter and length defined by a trailing end 66 of portion 60 of mandrel 56. As tool 52 continues to move towards outlet end 48 of die 38, portion 60 of mandrel 56 exits die 38 and portion 62 of mandrel 56 moves into and through throat 50 of die 38. As a result, an intermediate portion 28 of body 12 assumes a shape having an outer diameter defined by throat 50 and inner diameter and length defined by portion 62 of mandrel 56. A stepped or gradual transition portion may be formed between end portion 27 and intermediate portion 28 depending on the shape of mandrel 56.

Referring to FIG. 4D1, once tool 52 has reached a predetermined position, the method may continue with the steps of withdrawing tool 52 from die 38 and inserting another tubular blank 36A into die 38. Blank 36A is moved within die 38 until the leading end 40A of blank 36A engages the trailing end 42 of blank 36. The method may further continue with the steps of reinserting tool 52 into die 38 and moving tool 52 within die 38 until surface 58 of tool 52 engages the trailing end 42A of blank 36A. At this point, mandrel 56 extends through bore 44A of blank 36A and leading end 64 of portion 60 of mandrel 56 exits blank 36A and extends beyond leading end 40A of blank 36A into trailing end 42 of blank 36. Referring to FIG. 4D2, in an alternative embodiment of the invention, as opposed to reinserting tool 52 into die 38, a different tool 68 may be inserted into die 38. Like tool 52, tool 68 includes a main body 70 with a surface 72 configured to engage trailing end 42A of blank 36A and a mandrel 74 configured to extend through bore 44A of blank 36A beyond leading end 40A of blank 36A and into trailing end 42 of blank 36. Using a different tool 68 permits further variation in the formation of the inner diameter of blank 36 and the wall thickness of body 12. In the illustrated embodiment, for example, mandrel 74 of tool 68 includes portions 76, 78 having diameters that differ from one another (with portion 78 having a larger diameter than portion 76 in the illustrated embodiment) and that may differ from portions 60, 62 of mandrel 56 on tool 52. Referring to FIG. 3, portions 76, 78 are configured to form end 20 of body 12 in such a way that portion 30 of the end 20 is relatively thick to provide support for subsequent spline forming operations and/or formation of a ring groove for use in receiving a retaining clip used to prevent outboard movement of shaft 12 from the vehicle differential while another portion 31 of the end 20 is relatively thin to reduce the need for material removal when forming the inner diameter of end 20 to receive a plug or seal.

Referring to FIG. 4E1, the method may continue with the step of applying a force to tool 52 to move the tool 52 towards outlet end 48 of die 38 such that another end portion of body 12 of shaft 10 assumes a shape having an outer diameter defined by throat 50 and an inner diameter defined by the leading end 64 of portion 60 of mandrel 56. Once the trailing end 42 of blank 36 is ejected from die 38, extrusion of blank 36A may begin in the same manner as blank 36. In the illustrated embodiment, the extrusion of blank 36A can begin without removal of tool 52. Referring to FIG. 4E2, in an alternative embodiment in which a different tool 68 is used, the method may similarly continue with the step of applying a force to tool 68 to move tool 68 towards outlet end 48 of die 38 such that end portion 30, 31 of body 12 of shaft 10 assumes a shape having an outer diameter defined by throat 50 and an inner diameter defined by portions 76, 78, respectively, of mandrel 74 of tool 68. Once the trailing end 42 of blank 36 is ejected from die 38, tool 68 may be withdrawn and tool 52 reinserted and extrusion of blank 36A may begin in the same manner as blank 36.

Figure 4F:
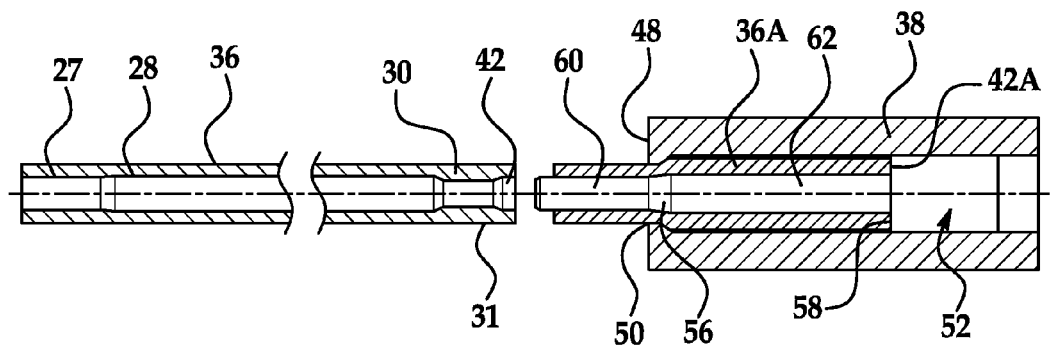
Figure 4F:
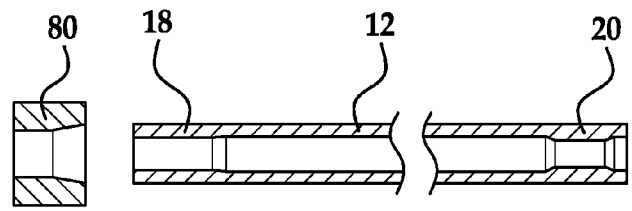
Figure 4G:
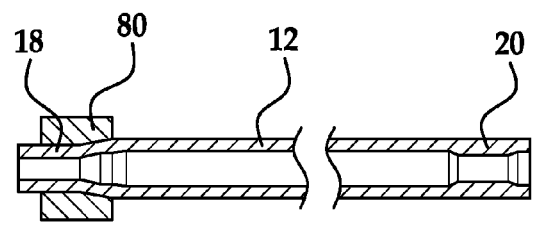

Referring to FIGS. 4F and 4G, additional forming steps may be performed to produce an axle shaft suitable for use as a drive axle. For example, the method may continue with the step of extruding one end 18 or 20 of body 12 through another die 80 to reduce the inner and outer diameters of end 18 or 20. The method may further continue with the step of forming a plurality of splines on end 20 through, for example, rolling, swaging or cutting operations to configure body 12 for coupling to a side gear of a vehicle differential. Similarly, the method may include the step of configuring a radially inner surface of one or both ends 18, 20 of body 12. For example, the inner surface of end 20 may be configured to receive a seal in order to plug bore 24 and prevent lubricant in the differential from entering bore 24 and thereby changing differential fluid dynamics and oil fill levels and prevent introduction of contaminants to the lubricant in the differential and the differential components.

The method may also include several steps for assembling wheel flange 14 to body 12. In particular, the method may include the step of applying heat to body 12 in order to harden at least a portion of body 12 such as end 18. Heat may be generated, for example, through induction by inserting body 12 or a portion of body 12 within a coil and generating a current in the coil. Thereafter, the method may include the steps of positioning wheel flange 14 such that flange 14 engages end 18 of body 12 and rotating at least one of body 12 and wheel flange 14 relative to the other to generate sufficient head to melt the engagement surfaces of body 12 and wheel flange 14. The method may further include the step of applying an axial force to one or both of body 12 and wheel flange 14 to maintain engagement and pressure. The speed of rotation, the duration of rotation and the pressure applied may be varied depending upon the material composition of body 12 and flange 14, the surface roughness of the engaged surfaces and other factors. The method may further include the step of stopping rotation of the body 12 and/or wheel flange 14 to allow fusing of the molten engagement surfaces. The resulting weld is continuous and homogenous. Some material from the melted surfaces forms flashing and what is commonly referred as a "ram's horn." Any material displaced inwardly within bore 24 of body 12 solidifies and remains within bore 24. Any material displaced outwardly, commonly may be removed by shearing or another machining operation.

A method for forming an axle shaft 10 in accordance with the present invention represent an improvement relative to conventional methods. By using successive blanks 36, 36A and accurately positioning the blanks 36, 36A and tools 52, 68, the inventive method allows rapid production of axle shafts 10 while also allowing the shafts 10 to be formed with varying inner and outer diameters. Further, the inventive method permits formation of a hollow axle shaft 10 with relatively thick end sections 18, 20 to accommodate loads from coupling the ends 18, 20 of the axle shaft 10 to other components. In the case of a rear drive axle shaft, for example, the method permits a relatively thick wall at the wheel flange joint thereby increasing weld joint strength.

While the invention has been shown and described with reference to one or more particular embodiments thereof, it will be understood by those of skill in the art that various changes and modifications can be made without departing from the spirit and scope of the invention.

What is claimed is:

1. A method for forming an axle shaft, comprising the steps of:
    inserting a first tubular blank having a leading end and a trailing end into a first die, said first die having an inlet end and an outlet end defining an extrusion throat through which said first tubular blank is extruded beginning with said leading end of said first tubular blank and ending with said trailing end of said first tubular blank;
    inserting a first tool into said first die, said first tool defining a surface configured to engage said trailing end of said first tubular blank and having a mandrel configured to be received within said extrusion throat of said first die and said first tubular blank, said mandrel having a first portion having a first diameter and a second portion having a second diameter greater than said first diameter;
    moving said first tool within said first die such that said surface of said first tool engages said trailing end of said first tubular blank and said first portion of said mandrel is disposed within said first tubular blank and said extrusion throat of said first die;
    applying a force to said first tool to move said first tool towards said outlet end of said first die and extrude said first tubular blank through said extrusion throat to form said axle shaft, a first end portion of said axle shaft assuming a shape having an outer diameter defined by said extrusion throat and an inner diameter defined by said first portion of said mandrel and a first intermediate portion of said axle shaft assuming a shape having an outer diameter defined by said extrusion throat and inner diameter defined by said second portion of said mandrel;
    withdrawing said first tool from said first die;
    inserting a second tubular blank having a leading end and a trailing end into said first die, said leading end of said second tubular blank engaging said trailing end of said first tubular blank;
    inserting a second tool into said first die, said second tool being separate from said first tool and defining a surface configured to engage said trailing end of said second tubular blank and having a mandrel configured to be received within said extrusion throat of said first die and said first tubular blank, said mandrel of said second tool having a third diameter less than said second diameter;
    moving said second tool within said first die such that said surface of said second tool engages said trailing end of said second tubular blank and said mandrel of said second tool is disposed within said first tubular blank and said extrusion throat of said first die; and
    applying a force to said second tool to move said second tool towards said outlet end of said first die such that a second end portion of said axle shaft assumes a shape having an outer diameter defined by said extrusion throat and an inner diameter defined by said mandrel of said second tool.

2. The method of claim 1 further comprising the step of extruding a first end of said axle shaft through a second die to reduce a diameter of said first end of said axle shaft.

3. The method of claim 2 further comprising the step of forming a plurality of splines on said first end of said axle shaft.

4. The method of claim 1 further comprising the steps of:
    positioning a wheel flange such that said wheel flange engages a first end of said axle shaft; and,
    rotating at least one of said axle shaft and said wheel flange relative to another of said axle shaft and said wheel flange to weld said axle shaft and said wheel flange together.

5. The method of claim 4 wherein the step of rotating at least one of said axle shaft and said wheel flange further comprises applying an axial force to at least one of said axle shaft or said wheel flange.

6. The method of claim 1 further comprising configuring a radially inner surface of a first end of said axle shaft to receive a seal.

7. The method of claim 1 further comprising the step of forming a plurality of splines on a first end of said axle shaft.

8. The method of claim 1 further comprising the step of applying heat to said axle shaft to harden said axle shaft.

9. The method of claim 1 further comprising the step of applying a lubricant to said first tubular blank prior to said step of inserting a first tubular blank into said first die.

10. The method of claim 1 wherein said mandrel of said second tool has a first portion having said third diameter and a second portion having a fourth diameter.

11. The method of claim 10 wherein said fourth diameter is greater than said third diameter.

12. The method of claim 10 wherein said second diameter is different from said fourth diameter.

13. The method of claim 1 wherein said first diameter is different from said third diameter.

14. The method of claim 1 further comprising the step of withdrawing said second tool from said first die and reinserting said first tool into said first die.

* * * * *